(No Model.) 3 Sheets—Sheet 1.
H. WYMAN.
LOOM.
No. 364,697. Patented June 14, 1887.
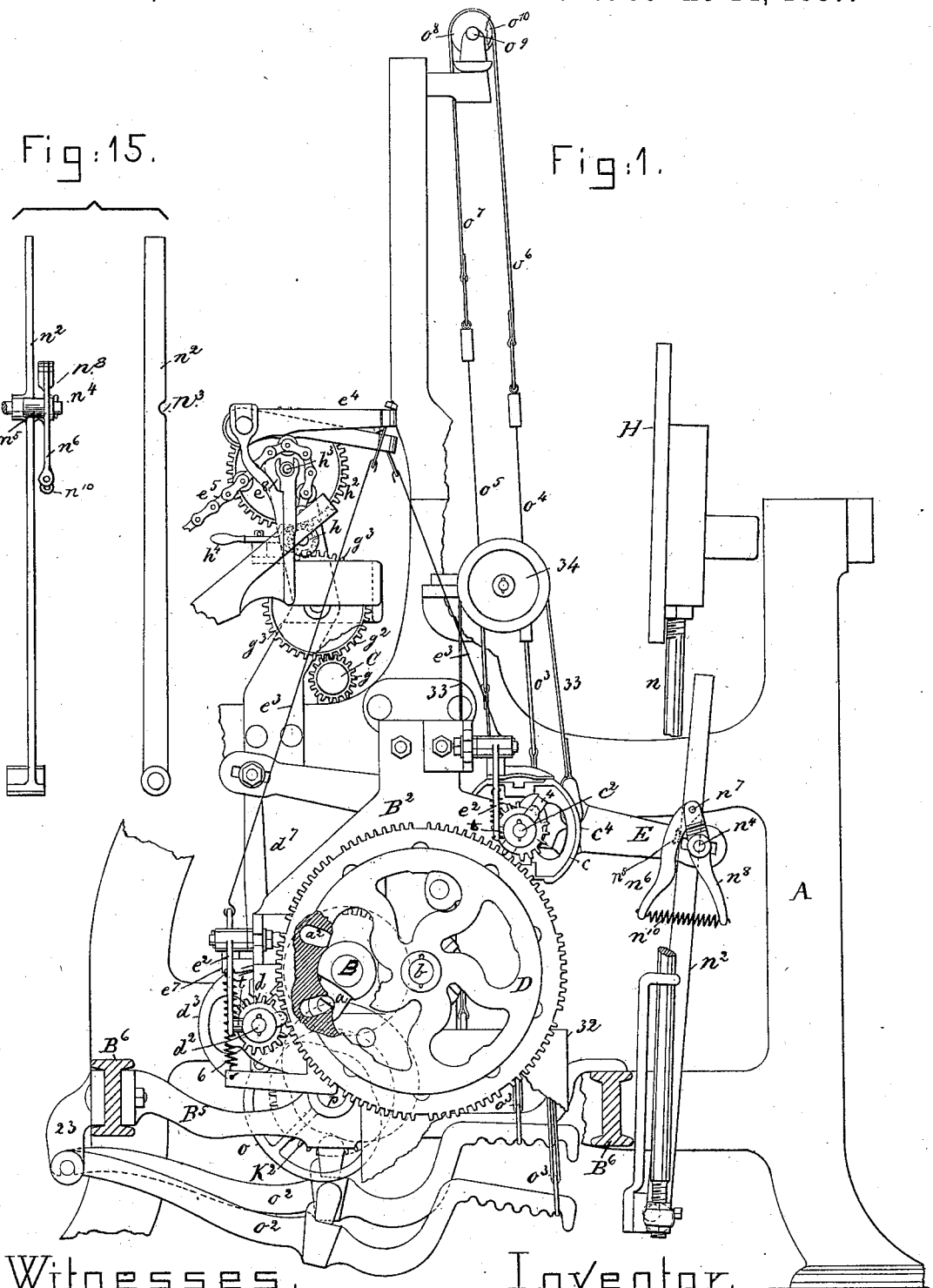
Fig. 15. Fig. 1.
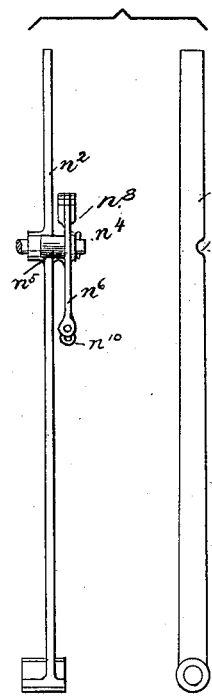
Witnesses.
Bernice J. Noyes.
John F. E. Plunkett.
Inventor.
Horace Wyman
By Crosby & Gregory
Attys

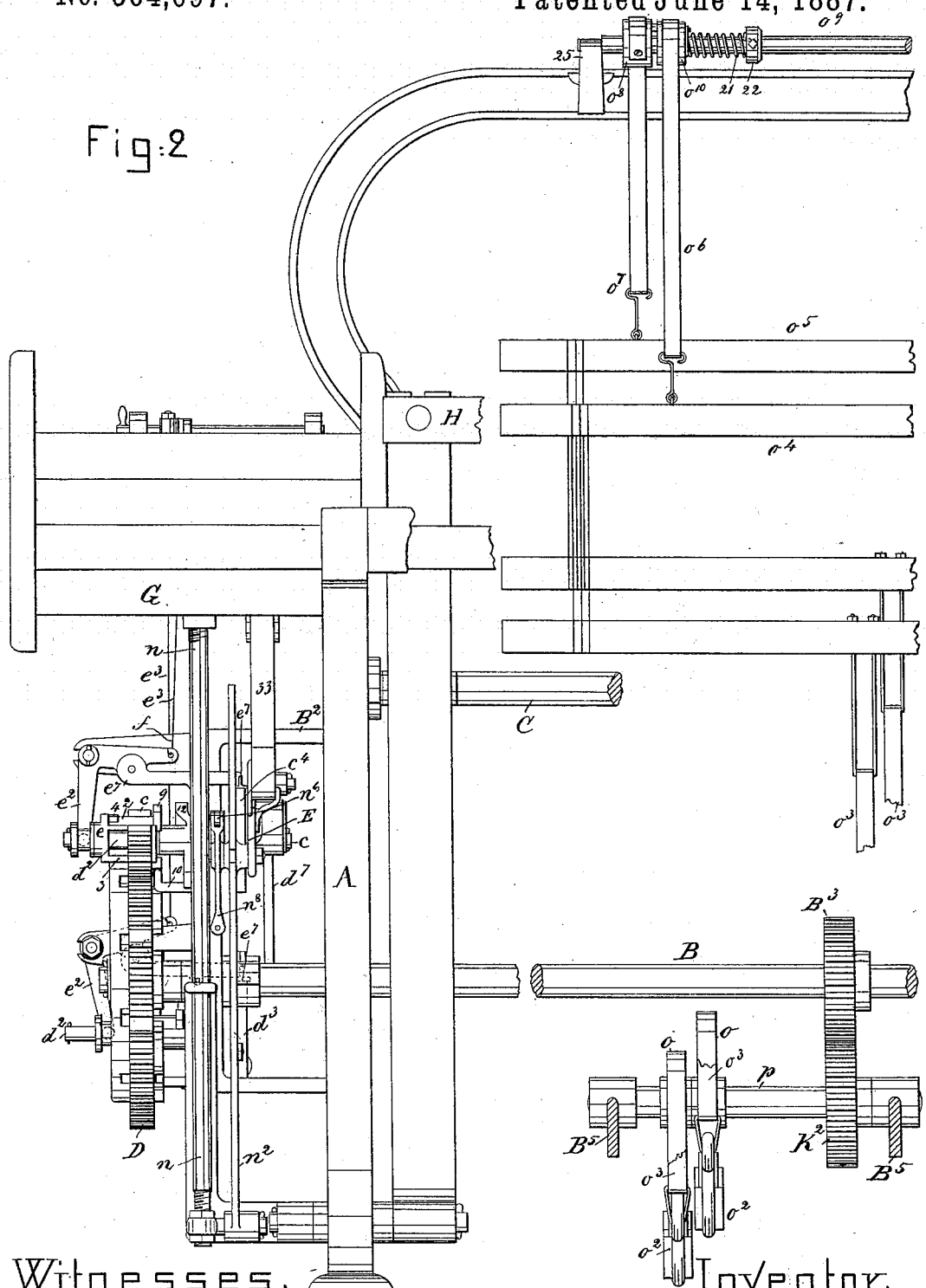

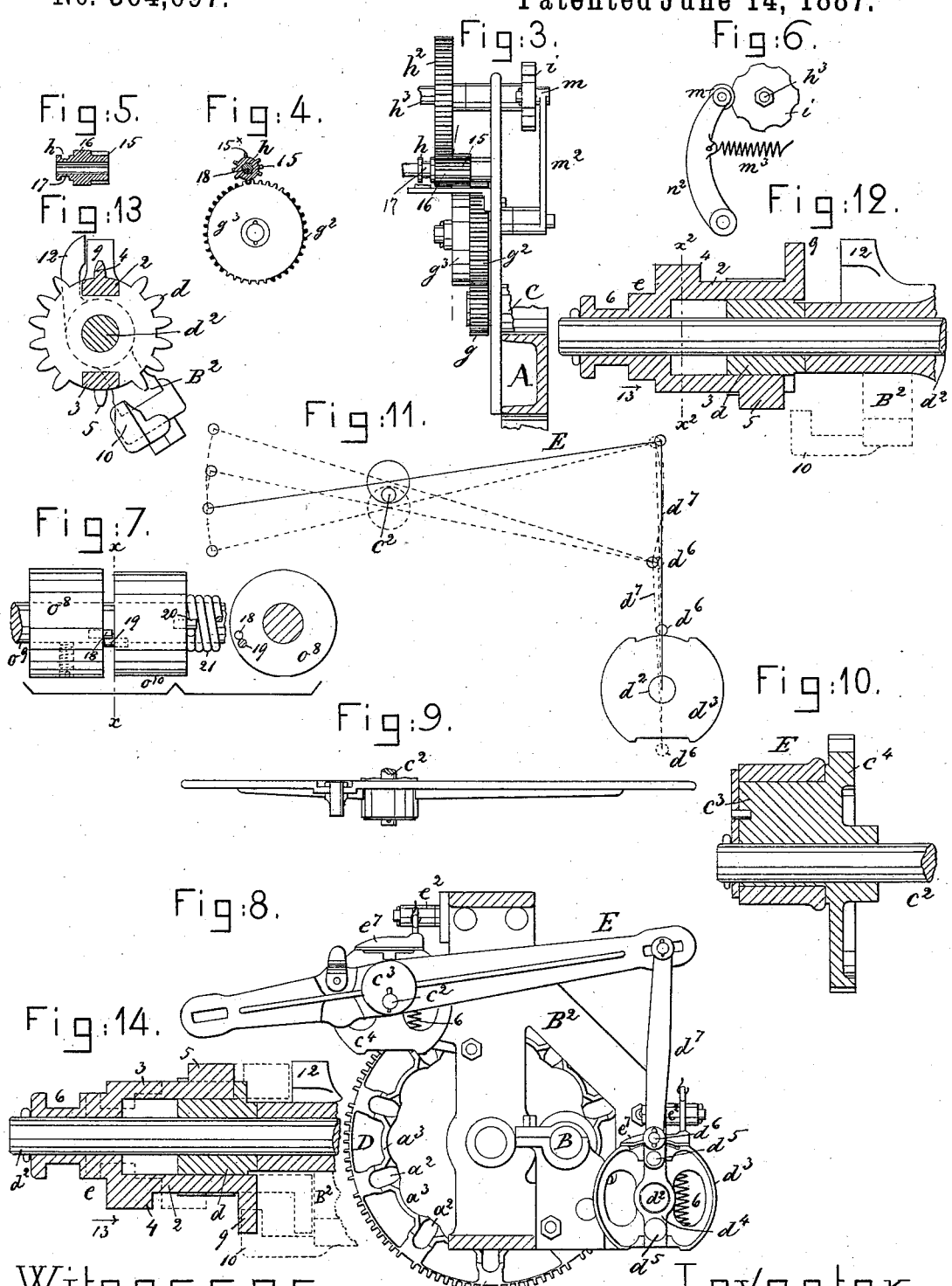

UNITED STATES PATENT OFFICE.

HORACE WYMAN, OF WORCESTER, MASSACHUSETTS.

LOOM.

SPECIFICATION forming part of Letters Patent No. 364,697, dated June 14, 1887.

Application filed February 23, 1882. Serial No. 53,466. (No model.)

*To all whom it may concern:*

Be it known that I, HORACE WYMAN, of the city and county of Worcester, State of Massachusetts, have invented an Improvement in Looms, of which the following description, in connection with the accompanying drawings, is a specification.

This invention in looms consists of improvements in the shuttle-box-operating mechanism; also of mechanism for actuating the pattern-surface or chain positively by gearing in operative connection with the crank-shaft, the said mechanism including an intermediate sliding-toothed hub the position of which controls the periods of movement or rest of the pattern-surface and permits it to be moved by hand independently of the movement of the lay, as will be described.

In this my improved shuttle-box mechanism, represented as adapted to operate a series of four shuttle-boxes, the shuttle-box lever has its fulcrum on an eccentric carried by a shaft, which has imparted to it at proper times a semi-rotation, the rear end of the shuttle-box lever, as herein shown, being joined with a crank on a semi-rotating shaft by means of a link or connecting-rod. Each of these two semi-rotating shafts has fixed upon it a pinion having at opposite points spaces to receive the arms of a sliding fork, the arms of the fork having single teeth located at different distances from the hub of the fork, so that the tooth of one or the other of the said sliding arms may be kept in line with the regular fixed series of teeth of the said pinion, according to the position of the sliding fork, the said teeth, which may be denominated "sliding teeth," being moved horizontally, or in the direction of the width of the said pinion, as the said fork is moved by mechanism under the control of the pattern-surface. The pinions referred to, when either of the two sliding teeth is so placed as to fall in line with the series of fixed teeth, will have a blank space diametrically opposite it, so that the teeth of the master-gear, which operates it, will run out from engagement at such blank space with the teeth of the said pinion and leave it at rest.

Each semi-rotating shaft of the shuttle-box mechanism has a holding-plate adapted to be engaged by a holding-lever, to prevent back-motion, rebound, or accidental movement of the shaft while the teeth on the arms of the sliding fork are being changed.

The pattern surface or chain for the shuttle-box mechanism derives its intermitting or step-by-step movement through a train of gearing, herein shown as actuated directly from the crank-shaft. A pinion on the crank-shaft engages and rotates continuously a gear having at one side of it a driving-gear with two series of isolated teeth, herein shown as composed of six teeth each, and the said isolated series of teeth engage the teeth of a driven gear having, say, eight teeth and four spaces with diametrically-opposite single teeth, each single tooth being situated between two of the spaces, so that the isolated series of teeth of the driving-gear referred to are each caused to rotate the driven gear for half a rotation, and then leave it at rest by running out of engagement at the spaces. The driven gear at the side of the series of teeth, having the four spaces, as described, has a continuous series of teeth which engage and rotate the gear fast on the shaft which operates the pattern-surface.

If the loom be stopped after one of the isolated series of teeth of the driving-gear referred to has passed from engagement with the teeth of the driven gear and before the next series of isolated teeth arrives in position to engage the driven gear, the latter and the shaft which moves the pattern-surface, it then being at rest, may be moved in either direction by hand.

Should the loom be stopped to mend a thread or find a mispick, and it be desired to suspend the movement of the shuttle-box pattern-chain, the driven gear may be moved longitudinally on its shaft far enough to withdraw its continuous series of teeth from engagement with the gear on the shaft which actuates the pattern surface or chain, and, if desired, the latter may at such time be turned by hand.

In looms for weaving plaids, wherein it is desired to actuate the harness-frames by treadles and cams, it is difficult to make the cams so that both levers will be in contact with the cams at every part of their revolution, and it is also desirable at times that one cam should move its lever in one direction farther than its fellow lever is being moved in the opposite direction. To enable each lever to be maintained in contact with the cam and permit one cam to be varied in shape from the other, I combine the harness-frames, their connected levers, lever-actuating cams, and straps with loose and fast rolls with which the said straps are connected, and with a spiral spring to permit the rolls to move with relation to each other. The free end of the spring acts against a pin on one side of the one of the rolls which is loose on the shaft, and this loose roll has at its other side a pin or projection, which is kept normally pressed against a pin or projection of the adjacent roll fast on the said shaft. My invention in this connection is as will be stated in the claims at the end of this specification.

Figure 1 represents an elevation, partially broken out, however, of a sufficient portion of a loom to illustrate my present improvements; Fig. 2, a front elevation of the left-hand end of the loom and a sufficient part of the loom near its center to show part of the harness-frames and their actuating devices. Fig. 3 is a detail front elevation of the mechanism for moving the shaft of the pattern surface. Figs. 4, 5, 6 are detail views of devices employed in Fig. 3. Fig. 7 is an enlarged detail of the rolls which support the upper straps of the harness-frames, the shaft on which the said rolls are placed, and the spring, and also a section between the said rolls on the dotted line $x\, x$. Fig. 8 is a detail view representing the shuttle-box lever and its actuating devices from the side opposite to that shown in Fig. 1. Fig. 9 is a top view of the shuttle-box lever on its eccentric fulcrum. Fig. 10 is an enlarged sectional detail view illustrating the eccentric fulcrum for the shuttle-box lever, with the hub of the said lever thereon. Fig. 11 is a diagram showing different positions of the shuttle-box lever. Fig. 12 is an enlarged longitudinal section of the pinion employed in the shuttle-box train of mechanism, its sliding forked hub and teeth, and the stops for the said pinion. Fig. 13 is a section of Fig. 12 on the dotted line $x^2\, x^2$. Fig. 14 is a detail view showing the parts represented in Fig. 12 in two other positions. Fig. 15 shows a detail view of the notched arm pivoted upon the shuttle-box rod, and a view of the said arm in connection with the lever which presses the notched arm upon the pin in the end of the shuttle-box lever.

The loom-frame A, of suitable shape to sustain the working parts, has in it the shaft B, which carries the usual picking-cams (not shown) and the crank-shaft C. The crank-shaft will be provided with the usual friction-clutch pulley to rotate it, when desired, and with a large gear to engage a second large gear on, and so as to move shaft B, all as in United States Patent No. 197,754, to which reference may be had.

The shaft B, at one end of it, has an arm, $a$, provided with a pin adapted to enter slots $a^2$ on the interior of the master-wheel D of the shuttle-box mechanism and move it intermittingly, and also with a hub partially cut away to act upon the concaved parts $a^3$ of the said master-wheel and hold it at rest when the pin of the said arm is not in one of the slots $a^2$, thus making what is called a "pin and star-wheel movement," all as in the said patent.

The master-wheel D, held on a stud, $b$, of the bracket B², bolted to the end of the loom-frame, has its teeth in series of nine, or, in other words, each tenth tooth, as herein shown, is omitted, so that the said master-wheel, when it is permitted to engage one of the pinions $c$ or $d$ will rotate it and the shaft $c^2$ or $d^2$ half of a rotation and then run out of gear and leave the said pinion and shaft at rest. These shafts $c^2\, d^2$, having their bearings on the bracket B², have fixed upon them the pinions $c\, d$. The shaft $d^2$ has fixed to it, near its inner end, the holding-plate $d^3$ and the arm $d^4$. The plate and arm are herein shown as bolted together by bolts $d^5$. The arm $d^4$ has a pin, $d^6$, and thus becomes a crank. The pin $d^6$ of the crank receives the end of the link or connection $d^7$, the other end of which is adjustably attached to the rear end of the shuttle-box lever E, having its fulcrum on the eccentric $e^2$, fast on shaft $c^2$. This eccentric at its rear side carries the holding-plate $c^4$.

Each pinion $c\, d$ has part of its teeth omitted at diametrically-opposite points, and its hub is grooved at the points where the teeth are omitted, so as to receive the arms 2 3, having teeth 4 5 of the sliding forked hub $e$ grooved at 6, to be entered by a pin, $t$, (see Fig. 1,) projecting laterally from the side of a pivoted lever, $e^2$, at the lower end of said lever, the two levers being connected in suitable manner by cords or wires $e^3$ with the usual fingers, $e^4$, which rest on and are moved by the pattern surface or chain $e^5$, extended over or about a cylinder, $e^6$, fast on the pattern-cylinder shaft $h^3$ and having heads notched as usual, or as in United States Patent No. 11,933, dated November 14, 1854, to receive the bars of the chain. As in the said patent, the chain $e^5$ will be provided with rolls or indicators and washers to act upon and move the fingers $e^4$ at the proper times.

Each lever $e^2$ has fulcrumed upon it a holder, $e^7$, the broad end of which is kept down upon one or the other of the holding-plates $c^4$ or $d^3$ by a suitable spring, 6, the said holder, when against a recessed or flattened portion of one of the said plates, as in Fig. 8, acting to prevent the shaft $c^2$ or $d^2$ from bounding back when arrested, as will be hereinafter described, or from being moved accidentally while the sliding forked hubs are being shifted.

The arms 2 3 of the sliding hubs $e$, they being fitted to slide out from and into the gears $c\, d$ parallel with the shafts $c^2\, d^2$, are of different lengths, as clearly shown in Fig. 12, and the tooth 4 of each arm 2 is nearer the hub $e$ than the tooth 5 of the arm 3, so that when tooth 5 has been slid into line with the teeth of the pinion with which it co-operates, as in Fig. 12, the tooth 4 will be held at one side of the teeth of the said pinion, so that it cannot be engaged by the teeth of the master-gear D.

When a sliding hub is moved to place a tooth, 5, in the position shown in Fig. 12 the teeth of the master-wheel D will strike said tooth 5 and rotate the pinion $c$ or $d$, with which it co-operates, and with it the shaft of the said pinion, half around; but as soon as the blank space of the pinion so operated, it being opposite the tooth 5, comes to the under side, the teeth of the master-wheel and pinion run out of gear and the pinion and the shaft on which it is secured stop. To insure the positive stopping of the pinion so moved, I have provided the arm 2 of each forked hub with a finger, 9, which, as soon as the tooth 5 arrives uppermost, strikes the stop 10, secured to or forming part of the bracket $B^2$, as in Fig. 14.

When a pinion has been so arrested by the finger 9 striking against stop 10 and the shaft having on it the said pinion is again to be turned half a rotation to turn the shuttle-box lever on its fulcrum, or shift its fulcrum and move the shuttle-box lever, (a lever of the first order,) the sliding forked hub $e$ is moved by its lever $e^2$ in the direction of the arrow 13, Figs. 12 and 14, which moves the finger 9 laterally away from and past the upturned end of stop 10, as in dotted lines, Fig. 14, and at the same time places the tooth 4 in line with the teeth of the pinion it is desired to rotate half-way around. As soon as the tooth 4 comes into position to serve as an operative tooth for the said pinion the teeth of the master-wheel D engage it and rotate the pinion and its connected shaft half-way around, at which time the finger 9 meets a second fixed stop, 12, forming part of the bracket $B^2$, and the pinion is again positively arrested. The next time the pinion, co-operating with a hub the finger 9 of which is held by the stop 12, is to be rotated half a rotation, the said hub will be moved out by the lever $e^2$ in the direction opposite the arrow 13 referred to, thus placing the said hub in the position shown in Fig. 12.

Fig. 11 shows in dotted and full lines the four different positions which the shuttle-box lever E will assume as it is moved or changed by the change of position of the crank-pin $d^6$ and the eccentric fulcrum $e^3$, one or both. In the full-line position the box next to the top box of the series of shuttle-boxes will be opposite the raceway of the lay. By turning the eccentric into its dotted-line position the uppermost box of the series of boxes would be placed opposite the lay. With the eccentric as in full line and the crank-pin $d^5$ as in dotted line the lowest box of the series of four boxes will be opposite the raceway of the lay. By changing the position of the crank and eccentric together, or separately, or by moving them in the same or opposite direction, either of the cells of the series of shuttle-boxes may be placed opposite the raceway of the lay.

The crank-shaft C has at its end the pinion $g$, which engages the gear $g^2$, having fixed to it the driving-gear $g^3$, having a portion of its teeth removed, leaving two isolated series of teeth equidistant apart, in this instance six teeth in each series. The series of teeth referred to intermittingly engage the toothed part 15 of the driven gear $h$, it having removed from it some of its teeth at diametrically-opposite points, (see Fig. 4,) leaving single teeth $15^x$ separated from the series directly opposite each other, and with a space at each side of the said teeth, on one side for the proper engagement of the first tooth of a series of teeth of the driving-gear $g^3$, and on the other side to allow the last tooth of the said series of teeth to leave it properly, and also to allow the teeth of the said driving gear $g^3$ to have a reverse movement when the loom is reversed by hand and engage the driven gear $h$ properly, when desired. The teeth of the continuously-rotating driving-gear $g^3$ engage one of the single teeth $15^x$ and rotate the driven gear $h$ half a rotation, and when said gear runs out of mesh leaves the driven gear $h$ at rest, leaving one of its separated teeth $15^x$ in position to be properly engaged by the teeth of the driving $g^3$ when a series of its teeth arrives in position to move it. The hub $h$, moved intermittingly, as described, has an unbroken series of teeth, 16, which engage the teeth of the gear $h^2$, fast on the shaft $h^3$, which supports and actuates the pattern surface or chain $e^5$. The removal of a tooth at each side of each of the isolated teeth $15^x$ enables the teeth of the driving-gear $g^3$ to properly mesh with the teeth of the driven gear $h$ and rotate the latter. If the driving-gear $g^3$ were always rotated in but one direction, the teeth $15^x$ would not need a toothless space at each side; but as the driving gear $g^3$ will at times be rotated backward, as when turning the crank-shaft of the loom backward to find a mispick, it becomes necessary to have a toothless space each side of each tooth $15^x$.

The shaft $h^3$ will be provided at one end with the usual cam-wheel, $i$, (see Fig. 6,) acted upon by the holder composed of the roll $m$, arm $m^2$, and spring $m^3$, to prevent accidental movement of it and the pattern-surface. Should the loom be stopped to mend a thread or find a mispick, and it be desired to suspend the movement of the shuttle-box pattern-chain, it is only necessary to slide the driven gear $h$ laterally, by the hand-lever $h^4$, (see Fig. 1,) far enough to withdraw the teeth of the part 15 from engagement with the teeth of the driving-gear $g^3$. Should the loom be stopped at a time when the teeth of the driving-gear $g^3$ and part 15 are not engaged, the pattern-surface may also at such time be turned freely by hand in either direction. This driven gear $h$ at the grooved part 17 might be engaged and shifted automatically by devices such as described in my application Serial No. 50,303, filed January 16, 1882, for moving the part marked $e^3$ in said application. Such devices, incorporated with the driven gear $h$, to withdraw its part 15 from engagement with the driving-gear $g^3$, would enable the movement of the pattern-surface to be suspended for any number of picks.

The rod $n$, carrying the usual shuttle-boxes, G, adapted to slide in the lay H, has pivoted upon it the arm $n^2$, provided, as shown in the detail Fig. 15, with a notch, $n^3$, in which is entered the pin $n^4$, fixed at the front end of the shuttle-box lever E. The arm $n^2$ is pressed toward the pin $n^4$, so that the notch $n^3$ is kept on the said pin by a lug, $n^5$, (see Fig. 15,) on a short lever, $n^6$, having its fulcrum at $n^7$ on a second short lever, $n^8$, it having its fulcrum on the pin $n^4$ of the shuttle-box lever. The two levers $n^6$ and $n^8$ are connected by a spring, $n^{10}$. When the movement of the shuttle-boxes is obstructed, the spring $n^{10}$ will yield and permit the notch of arm $n^2$ to slip from the pin $n^4$ of the shuttle-box lever.

The shaft B has a gear, $B^3$, which engages a gear, $K^2$, on a short shaft, $p$, held in bearings on stands $B^5$, secured to the cross-beams $B^6$. The shaft $p$ has fixed to it two cams, $o$, which act against the harness-levers $o^2 o^2$, having their fulcrum on the stand 23, Fig. 1. The front ends of levers $o^2$ are adjustably connected with the straps $o^3$, which are attached, as usual, to the lower cross-bars of the harness-frames $o^4$ $o^5$. The upper strap, $o^7$, of harness-frame $o^5$ is attached to the roll $o^8$, fast on the rod $o^9$, having its ends supported by and turning on suitable bearings, 25. The upper straps, $o^6$, of harness-frame $o^4$ are attached to the roll $o^{10}$, loose on rod $o^9$. The roll $o^8$ at one side has a pin, 18. The roll $o^{10}$ has at one side a pin, 19, and at its other side a pin, 20. (See Fig. 7.) A coiled spring, 21, having one end held by the collar 22, fixed to shaft $o^9$, acts by its other end against the pin 20 of roll $o^{10}$. The upper ends of straps $o^6$ $o^7$ are alternately wound upon and unwound from the rolls $o^8$ $o^{10}$ as the harness-levers and harness-frames are drawn down, the rod $o^9$ at such times turning on its end bearings. The spring 21, acting on pin 20 of roll $o^{10}$, normally keeps the pin 19 pressed against pin 18. The pressure of the spring 21 on roll $o^{10}$, may be varied by adjusting the collar 22. This spring 21 forms a yielding connection for the rolls which support the straps $o^6$ $o^7$. The spring 21 by its force acts upon the straps $o^6$ $o^7$ in such manner as to keep the harness-frames $o^4$ $o^5$ lifted sufficiently to constantly maintain their levers $o^2$ in contact with the cams $o$ $o$, which move them, whatever may be their shape, and also permits the ready application to the loom of cams differing in shape from each other. When spring 21 yields, the pins 18 19 separate. When one harness-frame ascends, the other descends, and vice versa. The weight of the shuttle-boxes is counterbalanced by a weight, 32, connected with a strap, 33, attached to the shuttle-box lever and extended over a loose pulley, 34, as shown in Fig. 1.

I do not broadly claim a shuttle-box lever of the first order mounted on an eccentric.

I claim—

1. A series of shuttle-boxes, a shuttle-box rod, the shuttle-box lever and suitable means to connect it with the shuttle-box rod, an eccentric to serve as the fulcrum for the said shuttle-box lever, a shaft to which the said eccentric is secured, a pinion fast on the said shaft and having some of its teeth removed from opposite sides, and a forked hub having teeth to be placed in line with the teeth of the said pinion, combined with suitable means to slide the said forked hub and rotate the said pinion, substantially as and for the purpose described.

2. A series of shuttle-boxes, a shuttle-box lever of the first order, and suitable means to connect the shuttle-box lever with the shuttle boxes, a connecting-rod at one end of the said lever, a crank-pin with which it is connected, a shaft to carry the said crank-pin, a pinion secured to said shaft having some of its teeth removed at diametrically-opposite points, and a forked hub having arms provided with teeth adapted to be placed alternately in line with the teeth of the said pinion, combined with means to move the said pinion and slide the said hub on the said shaft, substantially as described.

3. The combination of a shaft provided with a crank pin or eccentric, a pinion fixed thereon, having some of its teeth removed at diametrically-opposite points and having its hub grooved, a sliding hub having arms fitted to grooves in the hub of the pinion and provided with two separate teeth, and a lever in engagement with the said hub, and means to move the lever, substantially as and for the purpose described.

4. A series of shuttle-boxes, a shuttle-box rod, a shuttle-box lever, and means to connect it with the shuttle-box rod, a shaft having a crank pin or eccentric, a pinion secured to said shaft having some of its teeth removed at opposite points, a forked sliding hub on the said shaft provided with arms having teeth and means to automatically slide the said forked hub on the said shaft to place the teeth of its arms in line with the teeth of the said pinion when it is to be rotated, combined with means to rotate the said pinion and shaft, substantially as described.

5. The shuttle-box lever, a series of shuttle-boxes and means to connect them together, a shaft and an eccentric thereon, a pinion secured to the said shaft and having part of its teeth removed at opposite points, a sliding forked hub having arms provided with teeth adapted to be placed in line with the teeth of the said pinion when it is to be rotated, and means to move the said hub and pinion, combined with stops to arrest the rotating movement of the said shaft, substantially as described.

6. The pattern-surface shaft, its gear $h^2$, the pinion $g$, shaft to move it, and the gears $g^2$ $g^3$, the latter having isolated series of teeth and serving as a driving-gear, combined with the driven gear $h$, adapted to be slid on its shaft, and provided with a broken series of teeth, 15, to be engaged intermittingly by the teeth of the driving-gear $g^3$, substantially as and for the purpose set forth.

7. The harness-frames, their actuating-levers and cams, means to move the said cams, the straps or connections $o^3$, the shaft $o^9$, the loose and fast rolls, and the straps joined therewith and with the upper parts of the harness-frames, combined with a spring to act upon the loose roll, substantially as described.

8. A series of shuttle-boxes, a shuttle-box lever, means, substantially as described, to connect them, a semi-rotating shaft having an eccentric to support the shuttle-box lever, a semi-rotating shaft and crank, and means, substantially as described, to connect the crank and shuttle-box lever, a master-wheel and gearing, substantially as described, to rotate the said shafts to place the series of shuttle-boxes in any one of four different positions, a pattern-surface containing rows of indicators, and intermediate mechanism, substantially as described, to control the movement of each of the said shafts independently, a driving-gear, $g^3$, having a portion of its teeth removed, means, substantially as described, to operate it, a driven gear, $h$, having a tooth removed therefrom at each point where the said driving-gear is to engage and move it, and having a tooth, $15^x$, to be engaged by the teeth of the driving-gear $g^3$ when the latter is to move it, combined with the shaft carrying the pattern-surface, and gearing, substantially as described, between it and the said driven gear $h$ to actuate the pattern-surface, the movement of the pattern-surface being intermittent, substantially as and for the purpose set forth.

9. A series of shuttle-boxes, a shuttle-box lever, means, substantially as described, to connect them, a semi-rotating shaft having an eccentric to support the shuttle-box lever, a semi-rotating shaft and crank, and means, substantially as described, to connect the crank and shuttle-box lever, a master-wheel, and gearing, substantially as described, to rotate the said shafts to place the series of shuttle-boxes in any one of four different positions, a pattern-surface containing rows of indicators, and intermediate mechanism, substantially as described, to control the movement of each of the said shafts independently, a driving-gear, $g^3$, having a portion of its teeth removed, means, substantially as described, to operate it, a driven gear, $h$, having a tooth removed therefrom at each point where the said driving-gear is to engage and move it, and having a tooth, $15^x$, to be engaged by the teeth of the driving-gear $g^3$ when the latter is to move it, combined with the shaft carrying the pattern-surface, and gearing, substantially as described, between it and the said driven gear $h$ to actuate the pattern-surface, the movement of the pattern-surface being intermittent, substantially as set forth, and with a lever to move the said driven gear $h$ longitudinally, as specified.

10. The pattern chain-shaft, the gear, and notched cylinder thereon, adapted to carry a pattern-chain to control the selection of shuttle-boxes, driving-gear $g^3$, having isolated series of teeth, means to rotate it, and the intermediate toothed driving-gear, $h$, having isolated teeth, combined with means to move the said gear $h$ out of mesh with the gear $g^3$ when the notched cylinder is to remain at rest, substantially as described.

In testimony whereof I have signed my name to this specification in the presence of two subscribing witnesses.

HORACE WYMAN.

Witnesses:
J. B. SYME,
J. A. WARE.